(12) United States Patent
Stippler et al.

(10) Patent No.: US 7,781,000 B2
(45) Date of Patent: Aug. 24, 2010

(54) METHOD FOR BOILING WORT

(75) Inventors: Kurt Stippler, Marzling (DE);
Klaus-Karl Wasmuht, Ellingen (DE)

(73) Assignee: Krones AG, Neutraubling (DE)

( * ) Notice: Subject to any disclaimer, the term of this patent is extended or adjusted under 35 U.S.C. 154(b) by 1079 days.

(21) Appl. No.: 10/578,294

(22) PCT Filed: Nov. 3, 2004

(86) PCT No.: PCT/EP2004/012439

§ 371 (c)(1),
(2), (4) Date: Jul. 10, 2006

(87) PCT Pub. No.: WO2005/044971

PCT Pub. Date: May 19, 2005

(65) Prior Publication Data

US 2007/0134387 A1 Jun. 14, 2007

(30) Foreign Application Priority Data

Nov. 4, 2003 (DE) ................. 103 51 426

(51) Int. Cl.
*A23C 3/00* (2006.01)
(52) U.S. Cl. .............. 426/16; 99/276; 99/278
(58) Field of Classification Search ........... 426/16, 426/520; 99/276–278; A23C 3/00
See application file for complete search history.

(56) References Cited

U.S. PATENT DOCUMENTS 2,555,938 A * 6/1951 Seligman et al. ............ 426/492
4,836,097 A * 6/1989 Tretter ....................... 99/277.1
5,865,093 A * 2/1999 Wasmuht et al. .............. 99/278
6,968,773 B1* 11/2005 Stippler et al. ................ 99/278

FOREIGN PATENT DOCUMENTS

| DE | 3504500 C1 * | 7/1986 |
| DE | 3442516 C1 * | 9/1992 |
| DE | 201 07 924 U1 | 12/2001 |
| EP | 1 253 194 A1 | 10/2002 |
| EP | 1 469 062 A1 | 10/2004 |
| WO | WO-02/12433 A1 | 2/2002 |

OTHER PUBLICATIONS

Machine translation; DE 3504500; p. 1-6; Feb. 9, 1985.*
Machine translation; DE 3442516; p. 1-4; Sep. 24, 1992.*
Article entitled "Stromboli Boils Without Pressure—An Attractive Proposition", Brauwelt International, 2003.
Translation from German Article entitled Developments in the Field of "Wort Boiling", Brauwelt Online, 2002.

* cited by examiner

*Primary Examiner*—Drew E Becker
*Assistant Examiner*—Steven Leff
(74) *Attorney, Agent, or Firm*—Marshall, Gerstein & Borun LLP

(57) ABSTRACT

A method for boiling wort used in the production of beer the wort is boiled in a wort copper in which an inner boiler comprising a superimposed thin-film distributor is disposed. After boiling and after removal of the sludge in a whirlpool, the wort is again placed on the thin-film distributor for evaporation so that the wort copper simultaneously works as an evaporator.

3 Claims, 1 Drawing Sheet

METHOD FOR BOILING WORT

CROSS REFERENCE TO RELATED APPLICATION

This is the U.S. national stage under 35 U.S.C. §371, of international application no. PCT/EP2004/01239, having an international filing date of Nov. 3, 2004, and claims priority to German application no. 103 51 426.0 filed on Nov. 4, 2003.

FIELD OF THE DISCLOSURE

The disclosure relates to a method for boiling wort used in the production of beer.

BACKGROUND OF THE DISCLOSURE

When boiling wort, the wort is brought to boiling as is known. In this process, in recent times systems have become known (see Brauwelt, Issue 30/03, pp. 948) in which the wort is pumped by an inner boiler, through the center of which is fed a pipe at whose upper end a wort distributor screen is disposed. The wort distributor screen is formed in such a way that it delivers the wort into the interior in a thin layer through a circumferential slot, the width of which can be adjusted.

Because the width of the slot can be adjusted, it is possible to influence the surface of the wort film that is generated and also the circulation rate.

It turns out that gentle boiling can be achieved with such a system.

The boiled wort is then fed out of the copper and into the whirlpool, where the sludge separation takes place. From there, the wort then reaches the plate cooler.

In order to be able to remove substances, such as free dimethylsulfide (DMS), for example, that arise on the whirlpool and that may interfere with the beer quality, it is also known to arrange an evaporator, for example, in the form of a vacuum evaporator, between the whirlpool and the plate cooler. This, however, requires a corresponding apparatus-based expenditure and increases the total costs for the system.

SUMMARY OF THE DISCLOSURE

The object of the disclosure, on the other hand, consists of proposing a method with which it is also possible to reduce, for example, the DMS that still arises in the whirlpool, with a low apparatus-based expenditure.

This method takes advantage of the thin-film distributor that is already in the wort copper. According to this method, the wort, when boiled in the wort copper, is fed into the whirlpool. The sludge is precipitated there in the known manner. Instead of now being fed to the plate cooler via an additional evaporator, in the method according to the disclosure, the wort is pumped back into the wort copper and there fed into the actual forced circulation circuit in such a way that it is guided over the thin-film distributor. Consequently, the wort is given a large umbrella-like surface from which, for example, free DMS can effectively evaporate. The actual wort copper is consequently also used as an evaporator in the method according to the disclosure. In this way, it is not necessary to provide a separate evaporator.

The circulation pump present in the wort copper can be used for the pumping. Preferably, the inner boiler is not supplied with superheated steam when the wort copper is run in evaporation operation.

The wort can also be pumped over the thin-film distributor multiple times in evaporation operation, at least until the free DMS levels have reached the levels aimed at.

The adjustment that must be made to the system in order to allow this method to be carried out only needs to ensure that the wort can be fed from the whirlpool back into the wort copper and that it can then be put into the forced circulation circuit there.

BRIEF DESCRIPTION OF THE DRAWINGS

The method according to the disclosure is explained using FIG. 1, which is a schematic depiction of the system components for carrying out the method of the present disclosure.

DETAILED DESCRIPTION OF THE DISCLOSURE

Figure 1:
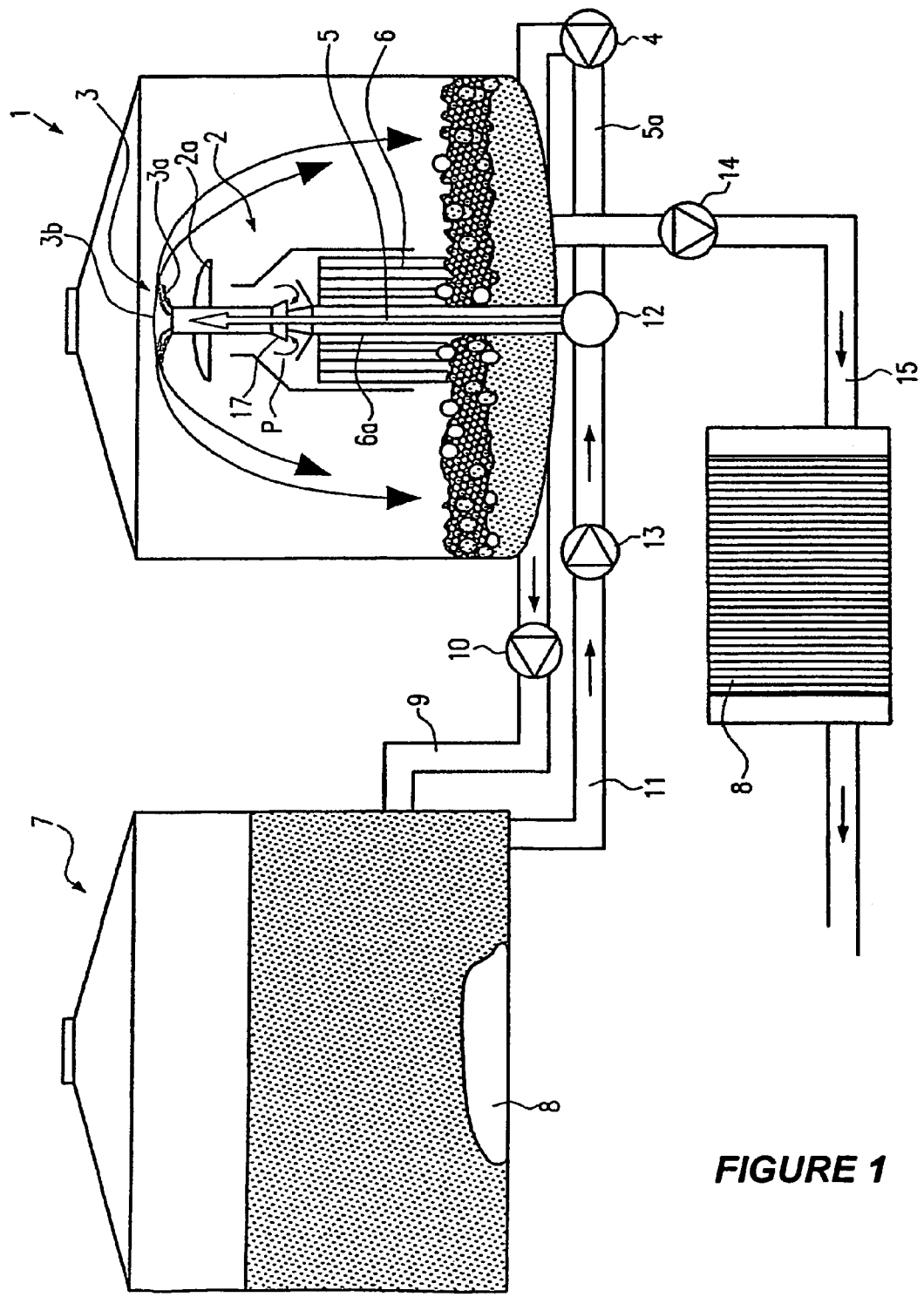

The system comprises a wort copper 1 as shown in FIG. 1. A pipe-bundle inner boiler 2 is centrally arranged in the interior of the wort copper. The pipe-bundle inner boiler has external pipes 6 that can, for example, be supplied with superheated steam, as well as a central, centred pipe 5, at the upper end of which a thin-film distributor 3 is arranged. The thin-film distributor is formed in the manner of a deflection screen. It has a lower deflection surface 3a, as well as an umbrella-like curved deflection surface 3b. The two surfaces 3a and 3b can be adjusted to one another in such a way that the discharge slot width can be changed.

Below this thin-film distributor is a further deflection screen 2a, which deflects the rising wort, which has been heated by the outer pipe bundles 6, into the interior of the copper, while the thin-film distributor guides the flow conducted through the central inner pipe 5.

The central inner pipe 5, together with the pipe section 5a and the pump 4, forms a forced circulation circuit for the wort that is to be boiled in the wort copper 1. With the pump 4, the wort is removed from the copper and re-directed into the central pipe 5 via the line section 5a and a change-over valve 12, and then from there in the circuit into the interior of the wort copper via the thin-film distributor.

The wort copper is connected to the whirlpool 7 via a pump 10 and a line 9. The sludge 8 should precipitate in the whirlpool.

A line 11, in which a pump 13 is, in turn, arranged, leads back from the whirlpool. This line discharges into the forced circulation circuit via the change-over valve 12, so that the wort now coming from the whirlpool can be directed into the central inner pipe 5.

Finally, a plate cooler 16 is connected to the wort copper via a pump 14 and a line 15 in the conventional manner.

It is understood that the piping is incomplete as shown and is also shown only in a schematic view, in order to make it possible to explain the method's main features.

With a system of this type, the method according to the disclosure can now be carried out as follows:

The wort is first brought to boil in the wort copper 1. The heat exchanger, through which superheated steam flows, heats the wort. A portion of the flow climbs upwards over the outer pipe bundle 6 and is deflected by the deflection screen 2a, while another portion is pumped in forced circulation via the pump 4, the line section 5a and the central pipe 5, at the same time running over the thin-film distributor 3. The terminal of the central pipe 5 is formed as a jet pump at the transition to the thin-film distributor, i.e., the wort rising in pipe 5 carries along the wort present in the upper part of the inner boiler upwards to the thin-film distributor, as indicated by the two arrows P.

In this way, because partial flows are already fed over the thin-film distributor in a thin layer again and again during the boiling of the wort, the wort can very gently be boiled, while simultaneously effectively reducing the damaging flavouring agents.

After the completion of the boiling process, the wort is pumped to the whirlpool 7 via the line 9 by means of the pump 10. There the sludge largely precipitates. Further material is also removed during this whirlpool phase. As is known, further free dimethylsulfide, which can possibly have negative effects on the taste of the beer that is obtained, arises, to give one example.

In order particularly to be able to remove these substances, the wort is now again fed into the forced circulation circuit via the line 11 and the change-over valve 12 by a pump 13, or, more precisely, to the lower end of the central pipe 5, wherein the wort can then be conveyed with the pump 13 via the thin-film distributor 3, so that, because of the very large surface achieved in this way, the remaining unwanted flavouring agents can be effectively steamed out.

After completion of the pumping via the line 11 into the wort copper, which then functions as an evaporation container, the pumping can also be done a few times via the pump 4 and the line 5a, after the appropriate switching of the change-over valve 12. The inner boiler remains out of operation as a boiler at this time, i.e., it is not supplied with superheated steam. It is, however, also completely conceivable to bring the boiler to a certain temperature lying below the boiling temperature, in order to control the evaporating processes suitably. To this end, it can be provided that the inner section of the heat exchanger surrounding the central pipe is formed in such a way that it can have a separate flow, so that the central pipe is surrounded by a small heating jacket which can then serve to temper the wort. We have indicated this area as 6a in the drawing.

After sufficient treatment, the wort is then brought, via the pump 14 and the line 15, to the plate cooler 16, where it is cooled in the known way and from where it then makes its way to the fermenting tank, for example.

Using the method according to the disclosure, a separate evaporation container becomes superfluous because the wort copper can take over this function.

We claim:

1. Method for boiling wort used in the production of beer, with the following steps:
   a) pumping wort in a wort copper with a pump through a central pipe of a forced circulation circuit, which contains a thin-film distributor arranged above the central pipe, a pipe-bundle inner boiler boiling the wort and inner area of the pipe bundle inner boiler surrounding and heating the central pipe;
   b) pumping the wort into a whirlpool after boiling the wort in the wort copper;
   c) pumping the wort from the whirlpool to the thin-film distributor of the wort copper via the central pipe; and
   d) cooling the wort.

2. Method according to claim 1, wherein pumping the wort from the whirlpool to the thin-film distributor comprises feeding the wort into the forced circulation circuit of the wort copper.

3. Method according to claim 1, wherein the inner boiler is not provided with steam while pumping the wort from the whirlpool to the thin-film distributor.

* * * * *

UNITED STATES PATENT AND TRADEMARK OFFICE
CERTIFICATE OF CORRECTION

| | | |
|---|---|---|
| PATENT NO. | : 7,781,000 B2 | Page 1 of 1 |
| APPLICATION NO. | : 10/578294 | |
| DATED | : August 24, 2010 | |
| INVENTOR(S) | : Kurt Stippler et al. | |

It is certified that error appears in the above-identified patent and that said Letters Patent is hereby corrected as shown below:

On the Cover Page:

At field (57), line 1, "beer the" should be -- beer in which the --.

Signed and Sealed this
Eighth Day of March, 2011

David J. Kappos
*Director of the United States Patent and Trademark Office*